Jan. 9, 1934.    G. C. REITH    1,942,493
COLD HANDLE
Filed March 28, 1932
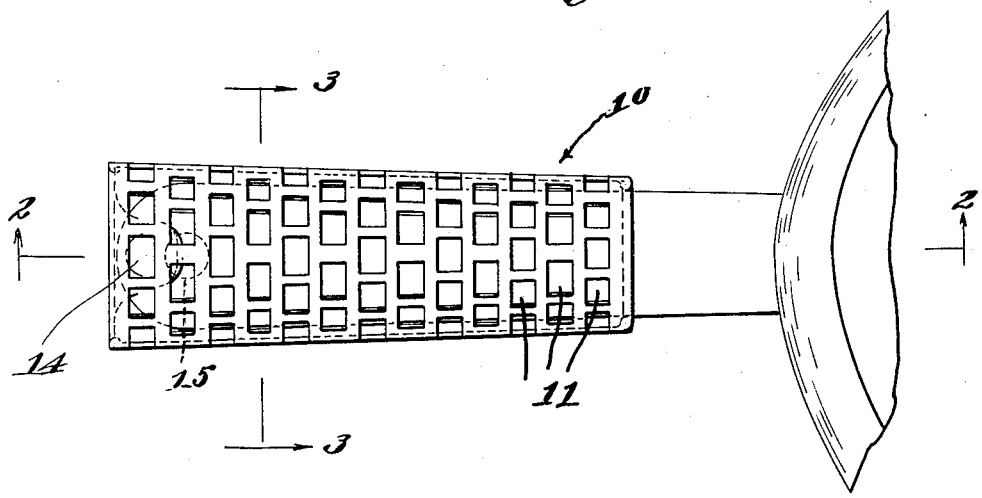
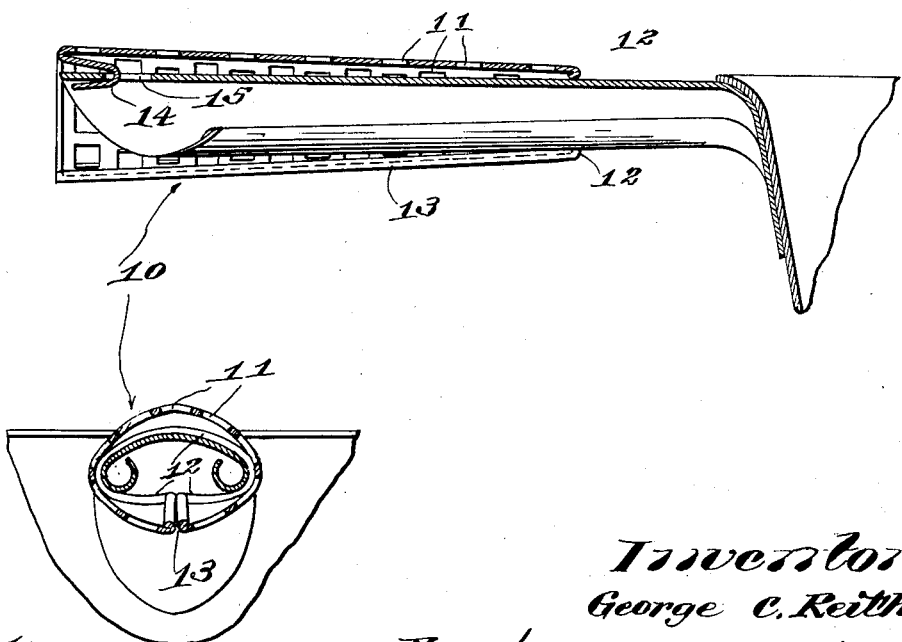
Inventor
George C. Reith
By James C. Hamilton
Attorney Patented Jan. 9, 1934

1,942,493

UNITED STATES PATENT OFFICE 1,942,493

COLD HANDLE

George C. Reith, Revere, Mass.

Application March 28, 1932. Serial No. 601,695

3 Claims. (Cl. 16—116)

My present invention relates to handles and more particularly to a cold handle for the purpose of application to hot handles of cooking utensils.

Cooking utensils as used by the housewife on hot stoves are at times too hot to be handled without hand pads even though they are provided with handles.

My present invention comprises a cold handle which may be more or less permanently mounted upon the utensil handle and which will radiate heat sufficiently quick enough to enable the operator to handle the utensil on the hot stove without the aid of pads.

The principal object therefore of my invention is an improved cold handle for cooking utensils and the like;

Another object is a cold handle which may be quickly applied to the utensil and left upon the utensil handle as long as may be desired, or it may be removed and applied to some other utensil handle at will;

Other objects and novel features comprising the construction and operation of my invention will appear as the description of the same progresses.

In the drawing illustrating the preferred embodiment of my invention;

Fig. 1 illustrates a plan view of the cold handle as applied to the handle of a cooking utensil;

Fig. 2 is a cross-section taken on the line 2—2 of Fig. 1, and

Fig. 3 is another cross-section taken on the line 3—3 of Fig. 1.

Referring more in detail to the drawing, 10 indicates the handle in general, being constructed from sheet-metal and having provided throughout with a plurality of openings 11 for the purpose of reducing the metal present in the handle to a minimum. Preferably, the metal used in the handle 10 should have as high a coefficient of heat radiation as is practicable, as aluminum or other similar alloys. It is to be understood also that I may prefer to perforate it in other designs of openings other than that shown in the drawing.

The front end of the handle tapers toward a theoretical vanishing point and the extreme edge 12 is rolled such that the only point of contact on the front portion of the handle is the rolled edges 12. The handle 10 is split at the lower side as indicated at 13 so that the handle 10 will readily fit a large number of utensil handles in one size of the cold handle.

At the rear portion of the handle 10 I have provided a hook-like member 14 which is formed from the material comprising the handle 10 by bending the same forward and inserting the end of the material forming the hook 14 through the opening 15 usually provided for the purpose of hanging the cooking utensil up. After having inserted the forwardly bent hook material through the opening 15 in the utensil handle it is bent rearwardly as shown in the drawings at Fig. 2, for the purpose of locking the cold handle 10 upon the handle of the utensil.

The handle 10 may be kept on the cooking utensil handle indefinitely if desired and at will may be taken off and placed upon a new or other cooking utensil handle.

It will be noted that the only places in contact with the handle of the cooking utensil is at the extreme front along the rolled edge 12 and at the rear hook portion 14. In addition to holding the cold handle from longitudinal movement on the cooking utensil, the hook 14 also acts as centering device between the two handles maintaining them in a spaced relation to each other such that the parallel surfaces of either handle are maintained in a separated position allowing the air to circulate freely therebetween and reducing heat conductivity to a minimum.

Having thus described my invention, what I claim as new is:

1. A cold handle for cooking utensils said utensils being provided with a conventional handle with an opening in its rearward portion, comprising a perforated casing adapted to engage with the handle of a cooking utensil at the front of said cold handle adjacent its edge, a reversely bent hook member adapted to engage in the opening of the cooking utensil at its rear portion and maintain said rear portion in a spaced relationship with said cold handle.

2. A cold handle for cooking utensils said utensils being provided with a conventional handle having an opening in the rear portion thereof, comprising, a perforated tubular member engaging with the handle of said cooking utensil at its front and rear portion, the front portion comprising a rolled under edge, the rear portion comprising a reversely curved hook member formed from the material comprising said cold handle adapted to engage with the opening in the rear portion of said cooking utensil handle and further adapted to centrally space said utensil handle within said cold handle in a fixed manner, said cold handle being split longitudinally throughout its under side for the purpose of tightly gripping said utensil handle.

3. A cold handle for cooking utensil handles and the like, said handles of said cooking utensils being provided with an opening at their rear portion thereof, comprising a perforated tubular member, said perforated tubular member being split longitudinally on its lower side, and being further provided with an inwardly rolled edge on its front end, a hook member formed with a reverse curve adapted to engage with the outer and inner surfaces of the upper rear portion of the utensil handle and firmly maintain said perforated tubular member in approximately concentric and parallel relation with said utensil handle.

GEORGE C. REITH.